US007959508B2

(12) United States Patent
Gauselmann

(10) Patent No.: US 7,959,508 B2
(45) Date of Patent: Jun. 14, 2011

(54) GAMING MACHINE WITH PLAYER SELECTION OF OPTIONS IN BONUS GAME

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 601 days.

(21) Appl. No.: 10/146,565

(22) Filed: May 14, 2002

(65) Prior Publication Data

US 2003/0216167 A1 Nov. 20, 2003

(51) Int. Cl.
*A63F 13/00* (2006.01)

(52) U.S. Cl. ................ 463/25; 463/16; 463/17; 463/18; 463/19; 463/30; 463/32; 463/37; 463/43

(58) Field of Classification Search .............. 463/16–20, 463/25, 46, 30, 32, 37; 273/138.1, 138.2, 273/139, 143 R, 269; 283/903
See application file for complete search history.

(56) References Cited

U.S. PATENT DOCUMENTS

| | | | | |
|---|---|---|---|---|
| 5,823,874 A | | 10/1998 | Adams | 463/17 |
| 5,848,932 A | | 12/1998 | Adams | 463/20 |
| 5,882,261 A | | 3/1999 | Adams | 463/20 |
| 5,997,401 A | | 12/1999 | Crawford | 463/20 |
| 6,033,307 A | * | 3/2000 | Vancura | 463/20 |
| 6,105,962 A | | 8/2000 | Malavazos et al. | 273/143 R |
| 6,126,542 A | * | 10/2000 | Fier | 463/16 |
| 6,168,520 B1 | | 1/2001 | Baerlocher et al. | 463/16 |
| 6,186,894 B1 | | 2/2001 | Mayeroff | 463/20 |

(Continued)

FOREIGN PATENT DOCUMENTS

GB 2144644 A * 3/1985

OTHER PUBLICATIONS

'The Official Let's Make a Deal Website', http://www.letsmakeadeal.com (Nov. 17, 2000), pp. 1-14, downloaded from the Intenet on Jul. 14, 2004.*

(Continued)

*Primary Examiner* — Peter DungBa Vo
*Assistant Examiner* — Sunit Pandya
(74) *Attorney, Agent, or Firm* — Patent Law Group LLP; Brian D. Ogonowsky

(57) ABSTRACT

In one embodiment, a gaming machine carries out a main game, such as a spinning reel type game, either using physical reels or simulated reels on a video screen. A special combination of symbols activates a video bonus game. The bonus game comprises a plurality of N unknown options in the form of icons, where the player may only make M choices, where M is less than N. In another embodiment, M is less than or equal to N. The unknown options may include, for example, different award credits. The options may be presented as hidden values behind doors or using other attractive presentation. The N values behind the closed doors are displayed in an order unrelated to the arrangement of the unknown options so the player sees what she can possibly win. The player then makes her M selections to win the awards behind the doors. There may be additional levels of the bonus game. Numerous other embodiments are described relating to providing the player unknown options and allowing the player to select a subset of the options. In one embodiment, the games involve some player strategy. For example, the game reveals a hidden value to a player, and the player must choose whether to take the revealed value or select another door.

40 Claims, 6 Drawing Sheets

U.S. PATENT DOCUMENTS

| | | | | |
|---|---|---|---|---|
| 6,190,255 | B1 * | 2/2001 | Thomas et al. | 463/20 |
| 6,309,300 | B1 * | 10/2001 | Glavich | 463/16 |
| 6,312,334 | B1 * | 11/2001 | Yoseloff | 463/25 |
| 6,357,749 | B1 * | 3/2002 | Feola | 273/292 |
| 6,413,161 | B1 * | 7/2002 | Baerlocher et al. | 463/20 |
| 6,569,015 | B1 * | 5/2003 | Baerlocher et al. | 463/16 |
| 6,599,185 | B1 * | 7/2003 | Kaminkow et al. | 463/16 |
| 6,609,971 | B2 * | 8/2003 | Vancura | 463/16 |
| 6,659,864 | B2 * | 12/2003 | McGahn et al. | 463/16 |
| 6,692,355 | B2 * | 2/2004 | Baerlocher et al. | 463/16 |
| 6,726,565 | B2 * | 4/2004 | Hughs-Baird | 463/25 |
| 6,749,504 | B2 * | 6/2004 | Hughs-Baird | 463/25 |
| 6,755,737 | B2 * | 6/2004 | Jackson et al. | 463/16 |
| 6,758,750 | B2 * | 7/2004 | Baerlocher et al. | 463/25 |
| 2002/0187827 | A1 * | 12/2002 | Blankstein | 463/20 |
| 2003/0064787 | A1 * | 4/2003 | Weiss | 463/20 |

OTHER PUBLICATIONS

"Let's Make a Deal", A Television Show.

* cited by examiner

GAMING MACHINE WITH PLAYER SELECTION OF OPTIONS IN BONUS GAME

FIELD OF INVENTION

This invention relates to games played on a gaming machine and, in particular, to a bonus game in a gaming machine, such as a slot machine.

BACKGROUND

A typical gaming machine found in casinos carries out a single game, such as displaying rotating reels having symbols, where the resulting symbol combinations correspond to awards to be paid to the player. Many newer gaming machines provide a bonus game where, for a special symbol combination, a secondary (or bonus) game is played that is different from the main game. This bonus game adds player excitement and, thus, results in a more popular and profitable gaming machine. In one form of bonus game, a special wheel spins and randomly stops to award a bonus amount to the player.

The Applicant believes that a bonus game having direct player interaction will increase the popularity of the gaming machine. Thus, what is needed is a gaming machine using player interaction to play a bonus game.

SUMMARY

In one embodiment, a gaming machine carries out a main game, such as a spinning reel type game, either using physical reels or simulated reels on a video screen. A special combination of symbols activates a video bonus game. The bonus game displays a plurality of N unknown options in the form of icons, where the player may only make M choices, where M is less than or equal to N. The unknown options may include, for example, different award credits. The options may be presented as hidden values behind doors or using another attractive presentation. The N values behind the closed doors are displayed to the player in an arrangement unrelated to the arrangement of the unknown options so the player sees what she can possibly win. The player then makes her M selection (s) to win the award(s) behind the door(s). There may be additional levels of the bonus game.

In another embodiment, displayed on the same screen is a number M of different multiplier values. For each option selected, the player applies one of the known multiplier values in the hope of maximizing her award after making M choices.

Numerous other embodiments are described relating to providing the player unknown options and allowing the player to select a subset of the options.

The unknown options may include credits, monetary values, multipliers, symbols to be collected to form a combination, entry into another type of bonus game (such as a double or nothing game), or an end-of-game. Additional features may also be provided in conjunction with the bonus game such as the machine revealing what is behind one of the doors and allowing the player to select that door or another door, or the machine offering clues to the various options, or other type of feature.

BRIEF DESCRIPTION OF THE DRAWINGS

The below described drawings are presented to illustrate some possible examples of the invention.

DETAILED DESCRIPTION

Although the invention can typically be implemented by installing a software program in most types of modern video gaming machines, one particular gaming machine platform will be described in detail.

Figure 1:
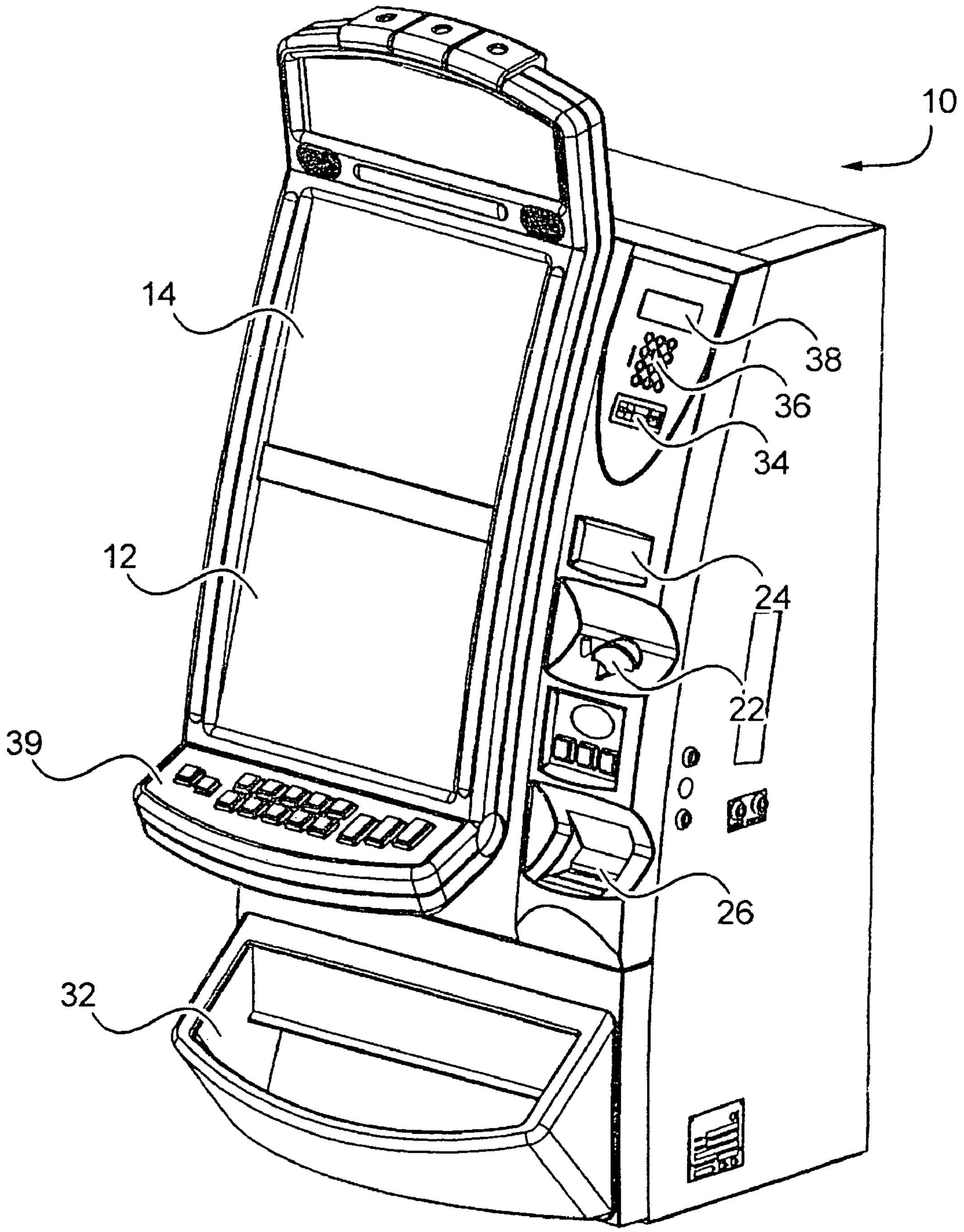
FIG. 1 is a perspective view of one of many examples of gaming machines that can incorporate the present invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, paylines, or other information, or may even display the game itself along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable button. Buttons 40 may be replaced by a touch screen with virtual buttons.

Figure 2:
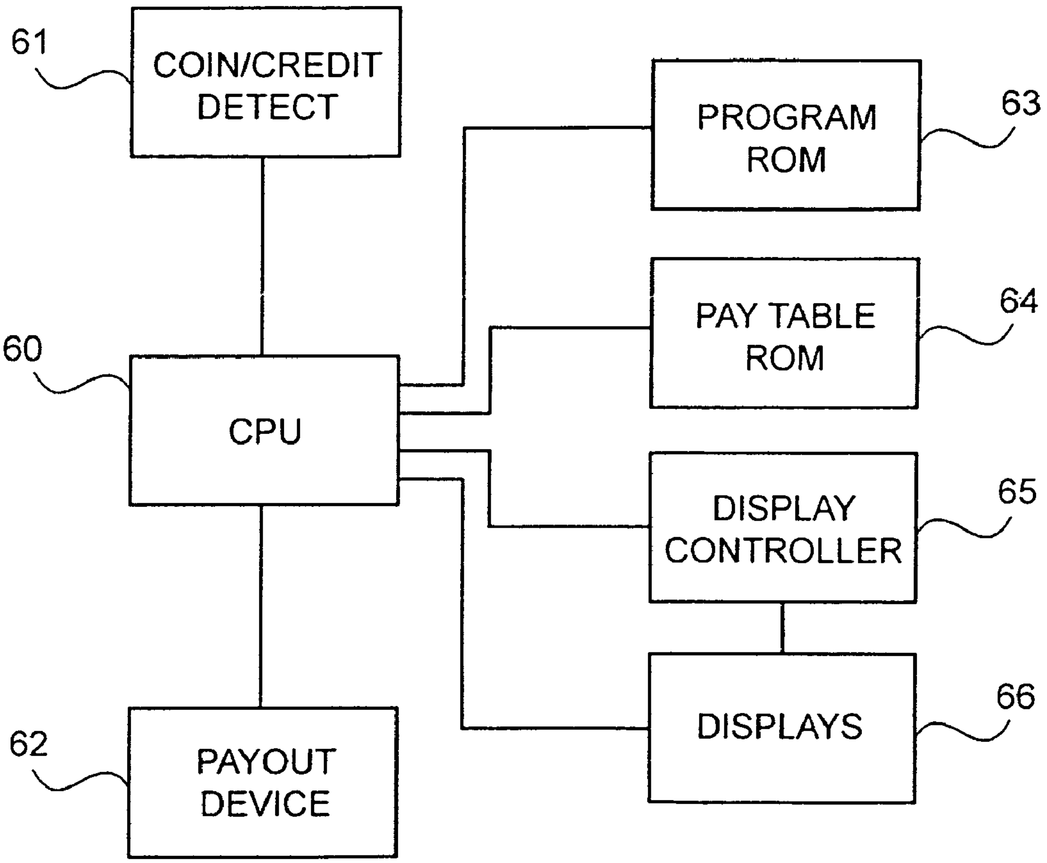
FIG. 2 is a block diagram of various key components in the gaming machine of FIG. 1.

FIG. 2 illustrates basic circuit blocks in a suitable gaming device. A control unit (CPU 60) runs a gaming program stored in a program ROM 63. A coin/credit detector 61 enables the CPU 60 to initiate a next game. A pay table ROM 64 detects the outcome of the game and identifies awards to be paid to the player. A payout device 62 pays out an award to the player in the form of coins upon termination of the game or upon the player cashing out. A payout may also be in the form of a coded paper ticket, credits on a smart card or magnetic strip card, or in any other form. A display controller 65 receives commands from the CPU 60 and generates signals for the various displays 66. If a display 66 is a touch screen, player commands may be input through the display screen into the CPU 60.

Figure 3:
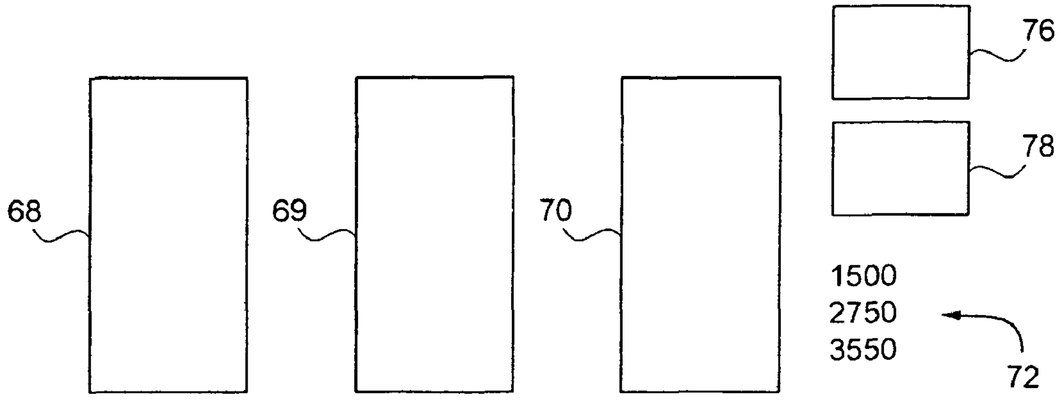
FIG. 3 is a simplified screen display of a first type of bonus game that may be played on the machine of FIG. 1, where award values are hidden behind closed doors, and the possible awards are displayed to the player.

FIG. 3 is a simplified bonus game display, which may be displayed on display 14 or display 12 in FIG. 1 after the main game has generated a particular outcome that automatically activating the bonus game. Such an outcome may be a special combination of symbols obtained in a simulated rotating reel type game. Alternatively, if the main game is a card game, the bonus game may be activated after a particular hand is obtained, such as a full house or higher. Virtually any type of game may be played as the main game and any selected outcome of the main game may activate the bonus game. Such triggering events activating a bonus game are well known, and the hardware/software used to initialize the bonus game may be conventional.

The bonus game may be presented to the player on the same screen as the main game or on a different screen. After the special outcome of the main game is achieved, the display 12 or 14 may briefly introduce and explain the bonus game.

In one example of the bonus game, shown in FIG. 3, three doors 68, 69, 70 are presented to the player. The three award values (e.g., credits) behind the doors are also displayed to the player in display area 72 so that the player now knows the possible awards but not where they are hidden. The player then chooses one of the doors, hoping to get the highest award.

Various means may be used to allow the player to make her selections. In one embodiment, the display screen is a touch screen, where the player simply touches one of the doors, and a conventional touch screen sensor controls the game program to reveal what is behind that door. Other types of player controls may include three buttons, where the player presses the button corresponding to one of the doors to select that door.

A display 76 is also provided to show the player how much she has just won, and another display 78 is provided to show the player the total accumulated credits.

The excitement of the player knowing the possible values to be won coupled with the player's own interaction with the game creates a very high degree of excitement for the player.

In one embodiment, after the bonus game of FIG. 3, the bonus game then proceeds to a next level, providing the player three more doors and three more possible awards to select from. In one embodiment, there are five bonus levels where, after the fifth bonus level, the bonus game automatically ends. In one embodiment, the bonus values increase at each level.

In another embodiment, one or more of the options includes an end of bonus game option where, if the player selects that option, the bonus game ends. The player may continue through the various levels of bonus games until the player selects the end of bonus game option.

Other types of bonus games are presented below which involve a high degree of player interaction.

Figure 4:
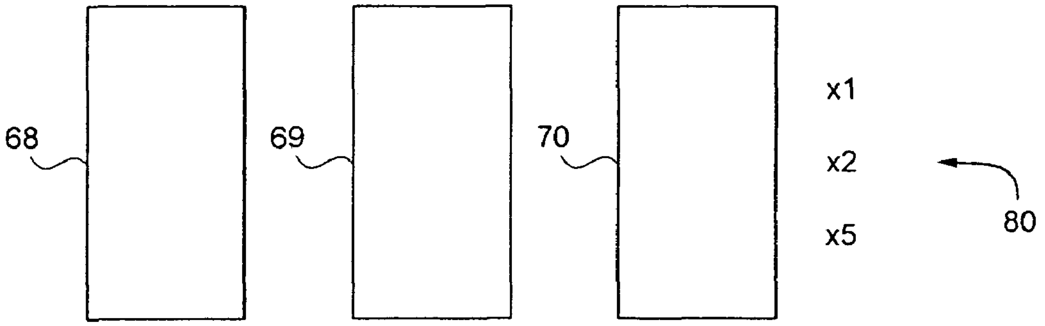
FIG. 4 is a screen display where the options include multipliers that multiply an award value.

FIG. 4 illustrates a bonus game also involving three doors 68-70, where the options to be selected are multipliers 80 that multiply an award value. The multipliers are displayed. The award value may be the initial value awarded upon the main game generating the special outcome that gave rise to the bonus game. All features described with respect to FIG. 3 may also be applied to the bonus game of FIG. 4.

Figure 5:
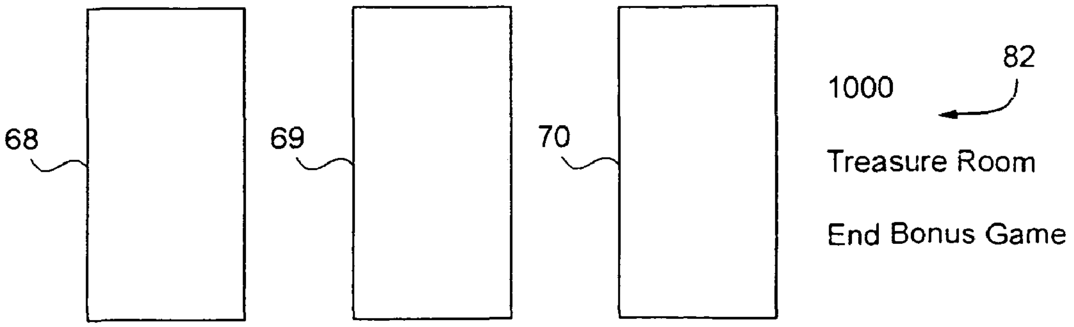
FIG. 5 is a screen display where the options include an award option, an option that takes the player to a different bonus game, and an option that ends the bonus game.

FIG. 5 illustrates another type of bonus game also involving three doors 68-70, where the options 82, displayed to the player, include an award value, an end bonus game option, and an option that takes the player into a different type of bonus game (e.g., the "Treasure Room"). If the player selects a door that has the award, the player gets that award. If the player selects the end bonus game door, the bonus game ends, and the main game can then again be played by the player. If the player selects the door that reveals the Treasure Room, the display changes to a different type of bonus game, such as that shown in FIG. 6.

Figure 6:
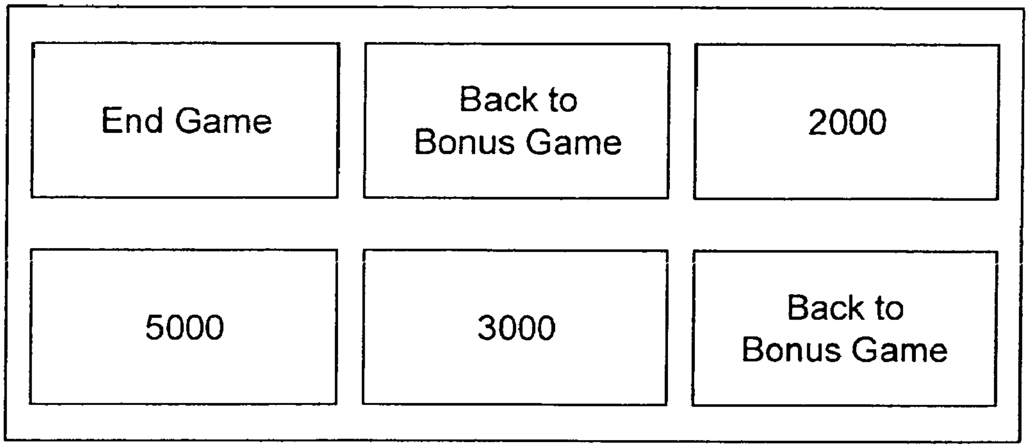
FIG. 6 is a screen display that would result if the player chose the option in FIG. 5 that took the player to another bonus game.

FIG. 6 is a sub-bonus game that the player has chosen by selecting the Treasure Room option in FIG. 5. The Treasure Room option may also provide the player unknown options with various types of awards. These options are revealed in FIG. 6 for the sake of clarity. As seen, certain options award the player an award, certain options end the Treasure Room bonus game and bring the player back to the previous bonus game, and certain options end the bonus round so as to bring the player back to the main game. As would be understood by those skilled in the art, any type of game involving player selection may comprise any of the bonus games.

Figure 7:
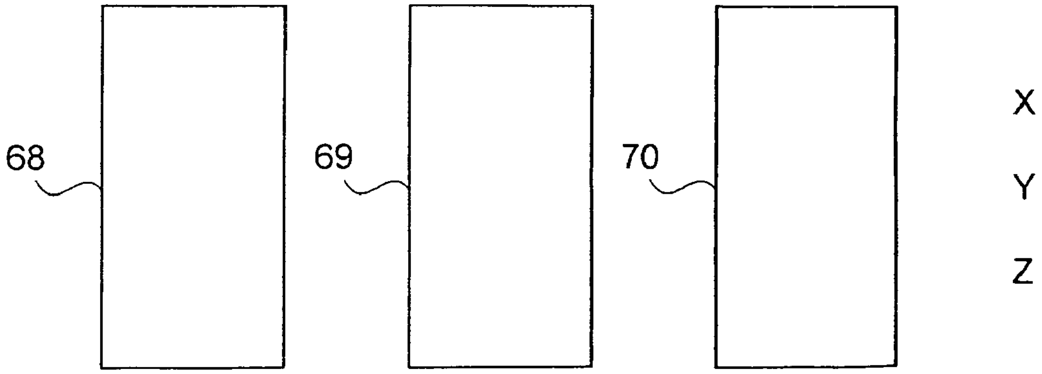
FIG. 7 is a screen display where the options include symbols, and the player plays, for example, five rounds of the bonus game to accumulate, for example, three of the same type of symbols to win a bonus award.

FIG. 7 shows another type of bonus game with three doors 68-70, where the options include three different types of symbols, in this case X, Y, and Z. The player chooses one of the doors and that symbol is held in a memory. The player has five chances to match three of the same symbols. The award for matching three X's may be different from the award for matching three Y's or three Z's.

In all of the above embodiments, there may be more or less doors or presentations other than doors, where the player selects unknown options. Any type of icon may be used to "hide" an element (e.g., credits, symbols).

Figure 8:
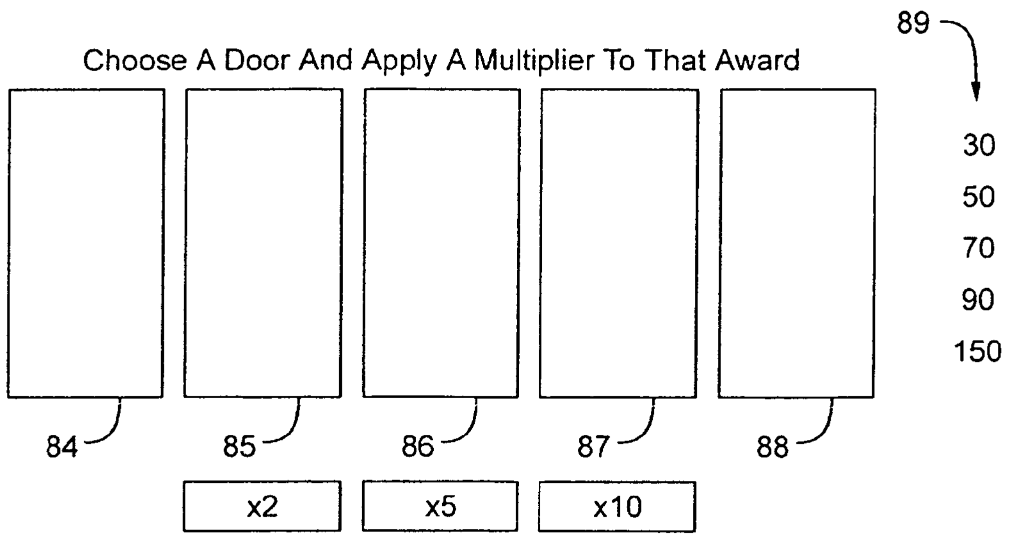
FIG. 8 is a screen display with awards behind the five option doors, where the player chooses a door and applies one of the three multipliers to the selected option in the hope of maximizing the total award after the three selections.
Figure 9:
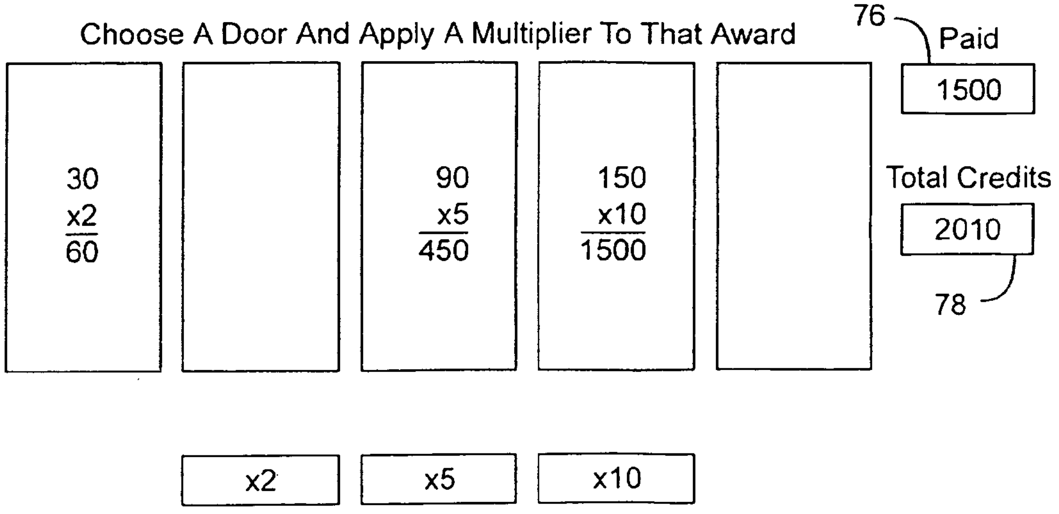
FIG. 9 illustrates one embodiment of the screen display after the player has made her three selections from the screen in FIG. 8.

FIG. 8 illustrates a type of game with even more player interaction, where N doors 84-88 or other icons are presented to the player, each door having a different unknown award value. In one embodiment, the possible award values for all the doors are displayed to the player in area 89. In this example, the award values are 30, 50, 70, 90, and 150 credits. The player gets to make M choices, where M is less than N. In the example given, the player is allowed to make three choices out of the five options. The player is also presented with M multipliers, in this case ×2, ×5, and ×20. The player chooses one of the five options to reveal the amount and then applies a multiplier to that selected amount. The multiplier then cannot be used again. For example, as illustrated in FIG. 9, the player's first choice reveals an award of 30. The player then selects the multiplier of ×2 to be applied to the award of 30 to result in an award of 60. The player then chooses another one of the doors to reveal the award of 70 and applies to it the multiplier of ×20 to award a value of 1400. On the next selection, the player chooses the award of 150, and applies to it the multiplier ×5 to give the player an award of 750. The bonus game then ends with the player winning a bonus of 2010 credits.

In another embodiment, M is less than or equal to N.

If the gaming machine utilizes a touch screen, the player touches one of the options to reveal the award behind that door, then presses one of the multipliers to multiply that award by the selected multiplier. Other type of controls may include a track ball or buttons.

In another embodiment, similar to FIG. 8, the five unknown options may be multipliers, and the player may apply three different displayed credit values (e.g., 30, 70, and 150) to a selected multiplier.

The game of FIG. 8 may include an end of bonus game selection and all of the other types of features described with respect to the other embodiments. The game of FIG. 8 may have a plurality of levels.

In one embodiment, a player-selection game has five levels, where the last level is the Treasure Room (or other feature) having the highest bonuses. In one embodiment, the Treasure Room has various hidden values ranging from low to high, and the player may only make X choices prior to the bonus game ending, where X is less than the possible choices. The game ends after the player has completed the Treasure Room stage. The Treasure Room may be any type of game.

The player-selection games may be configured to involve player strategy in making choices. During play of the various levels, the game may reveal to the player what is behind one of the doors (e.g., a credit award that also brings the player to the next level), and the player must decide whether to select that door or another door. One of the hidden elements may be an end-of-game, while the remaining hidden element may grant an award that is higher than the revealed award and bring the player to the next level, where the next level generally awards higher amounts. The game may require the player to pay a certain amount to see what is behind one of the doors. Alternatively, the game may require the player to answer a question or a riddle before the game reveals what is behind one of the doors. The game may even provide a clue (e.g., in the form of a riddle) that leads the player to the highest value door. The player may even choose a category of questions to be answered in order to reveal what is behind a door. Instead of questions, the game may offer a gamble for the player to be shown what is behind a door, such as allowing the player to choose red or black and the game randomly selecting either red or black. If the player is correct, the element behind a certain door is revealed. Such a subgame may involve any form of game of chance.

In one embodiment, there are more than three doors, and more than one door may be opened for a player by playing the strategic games.

Figure 10:
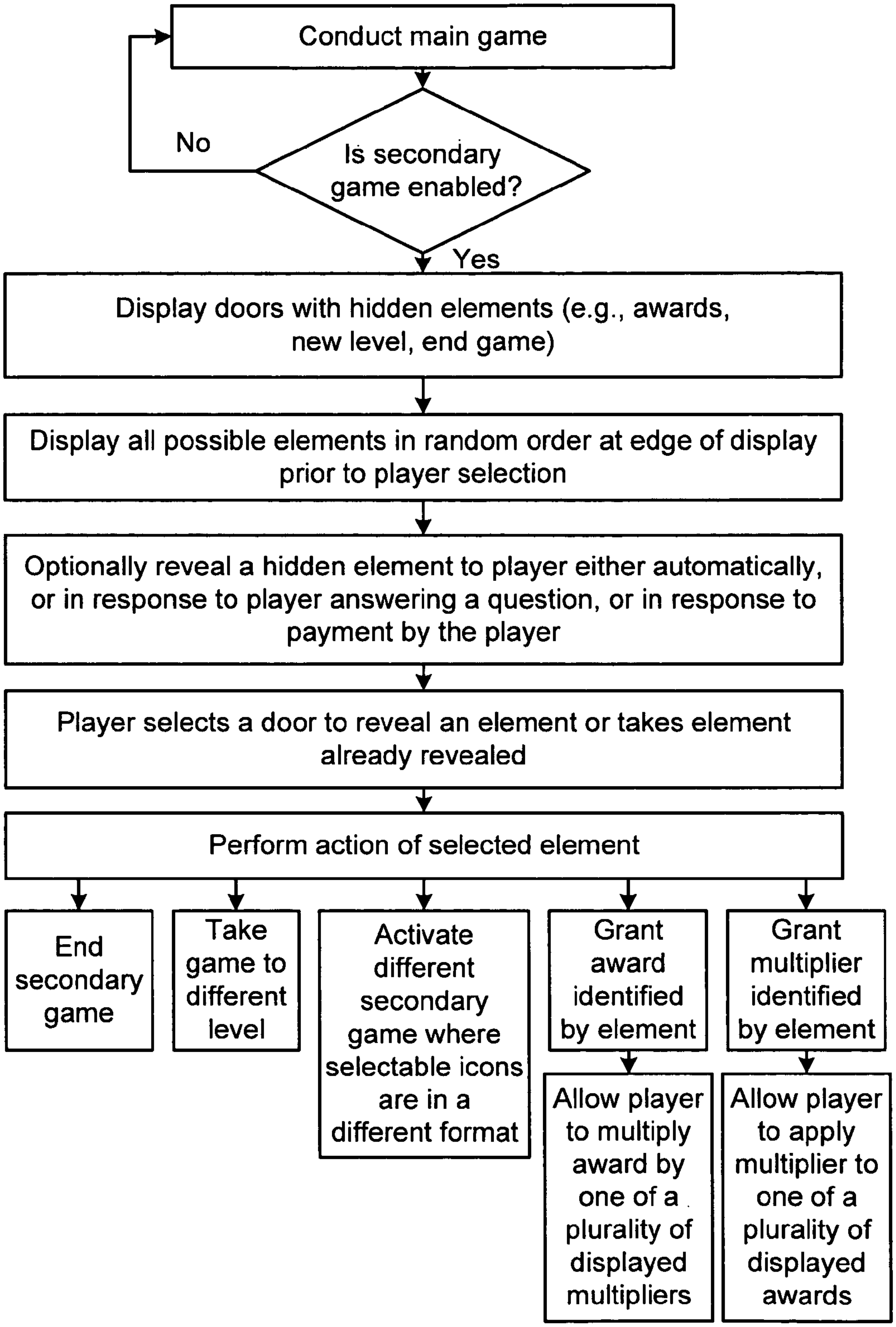
FIG. 10 is a self explanatory flowchart of various steps performed by the gaming machine and player in accordance with one embodiment of the invention.

FIG. 10 is a self explanatory flowchart of various steps performed by the gaming machine and player in accordance with one embodiment of the invention described above.

While particular embodiments of the present invention have been shown and described, it will be obvious to those skill in the art that changes and modifications may be made without departing from this invention in its broader aspects and, therefore, the appended claims are to encompass within their scope all changes and modifications that fall within the true spirit and scope of the invention.

What is claimed is:

1. A gaming method comprising:

conducting a main game by a gaming device, the main game having a plurality of possible outcomes, at least one of the outcomes enabling a secondary game;

after the main game generates said at least one of the outcomes, enabling the secondary game, the secondary game comprising:

displaying, on a display screen, a plurality of icons to a player, each icon representing an unknown element;

displaying, on the display screen, all the elements to a player without identifying which icons are associated with the elements prior to player selection; and receiving player selection signals, by the gaming device, conveying a selection of at least one of the icons, wherein there are N icons, and the icons, if selected, convey award values, the method further comprising:

displaying on the display screen to the player M multiplier values, where $M \leqq N$, where M and N are integers, and where the M multiplier values are displayed without being first selected by the player; and allowing the player to apply a multiplier value to a selected icon.

2. The method of claim 1 wherein the icons resemble closed doors.

3. The method of claim 1 wherein at least one of the icons, if selected, ends the secondary game.

4. The method of claim 1 wherein at least one of the icons, if selected, activates a different secondary game.

5. The method of claim 1 wherein there are three icons on a screen for the player to choose from.

6. The method of claim 1 wherein there are more than three icons for the player to choose from.

7. The method of claim 1 where there are N icons, and the player is only allowed to select M of the icons, where $M<N$ and where M and N are integers.

8. The method of claim 1 where there are N icons, and the player is only allowed to select M of the icons, where $M \leqq N$ and where M and N are integers.

9. The method of claim 1 further comprising:

after the player has made one or more selections from the icons, displaying a next level of the secondary game.

10. The method of claim 9 further comprising ending the secondary game after a predetermined plurality of different levels of the secondary game are played.

11. The method of claim 9 wherein the secondary game ends after the player selects an icon that automatically ends the secondary game.

12. The method of claim 1 wherein at least one of the icons, if selected, activates a different secondary game, wherein the different secondary game comprises a display of various icons in a format different from the initial secondary game, each icon representing an unknown element, the method further comprising receiving player selection signals conveying a selection of at least one icon in the different secondary game.

13. The method of claim 1 further comprising allowing the player to choose only one icon per display screen in the secondary game.

14. The method of claim 1 further comprising revealing an element associated with one of the icons and allowing the player to either keep that element or select a different icon.

15. The method of claim 14 wherein revealing an element comprises the secondary game automatically revealing the element.

16. The method of claim 14 wherein revealing an element comprises requiring a player to wager one or more credits to reveal an element.

17. The method of claim 14 wherein revealing an element comprises allowing a player to play game of chance, where a winning outcome of the game of chance reveals the element.

18. The method of claim 1 wherein at least one of the icons, if selected, enables the player to play a third game, the third game giving the player an opportunity to multiply an award.

19. The method of claim 18 wherein the multiplication is double or nothing.

20. A gaming method comprising:

conducting a main game by a gaming device, the main game having a plurality of possible outcomes, at least one of the outcomes enabling a secondary game;

after the main game generates said at least one of the outcomes, enabling the secondary game, the secondary game comprising:

displaying, on a display screen, plurality of icons to a player, each icon representing an unknown element;

displaying, on the display screen, all the elements to a player without identifying which icons are associated with the elements prior to player selection; and receiving player selection signals, by the gaming device, conveying a selection of at least one of the icons, wherein there are N icons, and the icons, if selected, convey multiplier values, the method further comprising:

displaying to the player, by the display screen, M award values, where $M \leqq N$, where M and N are integers, and where the M award values are displayed without being first selected by the player; and allowing the player to apply an award value to a selected icon.

21. A gaming device comprising:

a display screen for displaying a main game, the main game having a plurality of possible outcomes, at least one of the outcomes enabling a secondary game; and at least one processor and display for displaying the secondary game, the at least one processor being programmed for carrying out the secondary game comprising:

displaying, on the display screen, a plurality of icons to a player, each icon representing an unknown element;

displaying, on the display screen, all the elements to a player without identifying which icons are associated with the elements prior to player selection; and receiving player selection signals, by the gaming device, conveying a selection of at least one of the icons, wherein there are N icons, and the icons, if selected, convey award values, the secondary game further comprising:

displaying to the player, on the display screen, M multiplier values, where $M<N$, where M and N are integers, and where the M multiplier values are displayed without being first selected by the player; and allowing the player to apply a multiplier value to a selected icon.

22. The device of claim 21 wherein at least one of the icons, if selected, ends the secondary game.

23. The device of claim 21 wherein at least one of the icons, if selected, activates a different secondary game.

24. The device of claim 21 wherein there are at least three icons on a screen for the player to choose from.

25. The device of claim 21 wherein the secondary game further comprises:

after the player has made one or more selections from the icons, displaying a next level of the secondary game.

26. The device of claim 21 wherein the secondary game further comprises ending the secondary game after a predetermined plurality of different levels of the secondary game are played.

27. The device of claim 26 wherein the secondary game ends after the player selects an icon that automatically ends the secondary game.

28. The device of claim 21 wherein at least one of the icons, if selected, activates a different secondary game, wherein the different secondary game comprises a display of various icons in a format different from the initial secondary game, each icon representing an unknown element, the secondary game further comprising receiving player selection signals conveying a selection of at least one icon in the different secondary game.

29. The device of claim 21 wherein the secondary game further comprises allowing the player to choose only one icon per display screen in the secondary game.

30. The device of claim 21 wherein the display is a touch screen.

31. The device of claim 21 wherein the display is a video screen.

32. The device of claim 21 wherein the secondary game reveals an element associated with one of the icons and allows the player to either keep that element or select a different icon.

33. The device of claim 32 wherein the secondary game automatically reveals the element.

34. The device of claim 32 wherein the secondary game requires a player to wager one or more credits to reveal an element.

35. The device of claim 32 wherein the secondary game allows a player to play game of chance, where a winning outcome of the game of chance reveals the element.

36. A gaming method comprising:

conducting a main game by a gaming device, the main game having a plurality of possible outcomes, at least one of the outcomes enabling a secondary game;

after the main game generates said at least one of the outcomes, enabling the secondary game, the secondary game comprising:

displaying, on a display screen, plurality of icons to a player, each icon representing an unknown element;

revealing at least one unknown element to the player prior to the player making any selection of the icons;

allowing the player to take the revealed element or select one of the remaining unknown elements; and receiving player selection, by the gaming device, signals conveying a selection of at least one of the icons.

37. The method of claim 36 wherein one of the unknown elements ends the secondary game, and another of the unknown elements enables the player to continue on to a next level.

38. The method of claim 37 further comprising advancing the secondary game to a next level.

39. The method of claim 36 further comprising requiring the player to pay in order to reveal at least one element to the player.

40. The method of claim 36 further comprising requiring the player to answer a question in order to reveal at least one element to the player.

* * * * *